INVENTORS.
FREDERICK R. WEYMOUTH.
FRANK A. WEDBERG.
BY
ATTORNEYS.

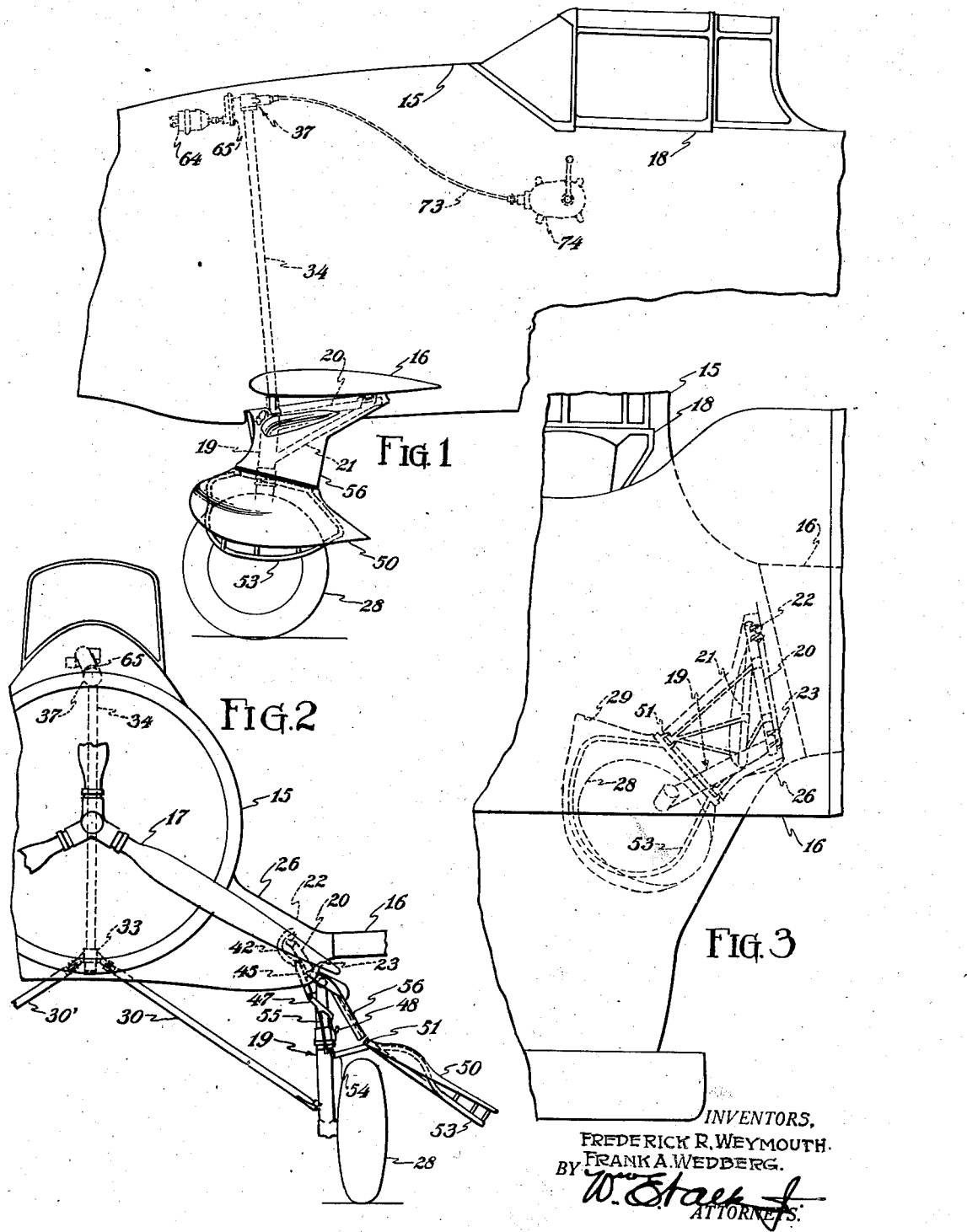

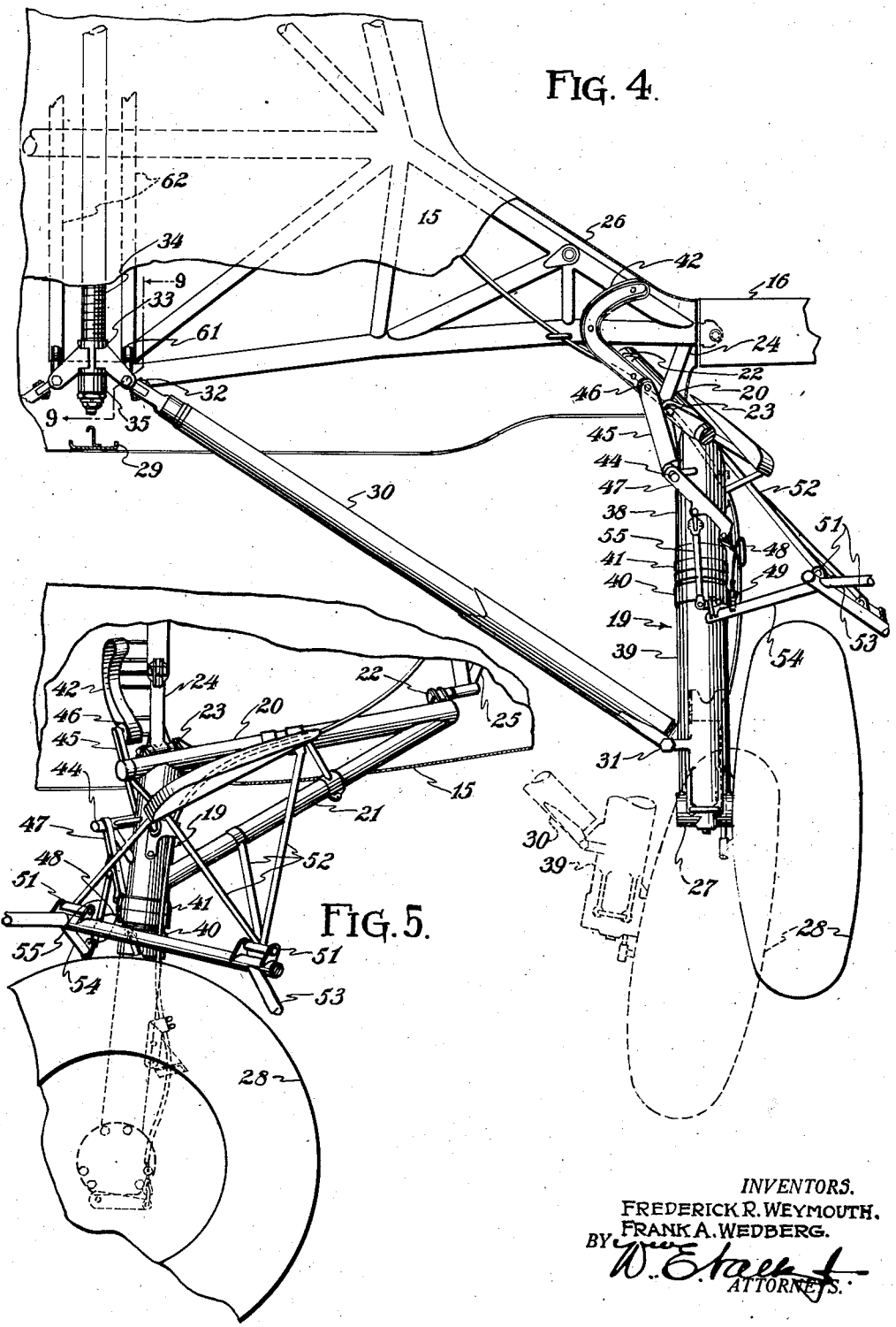

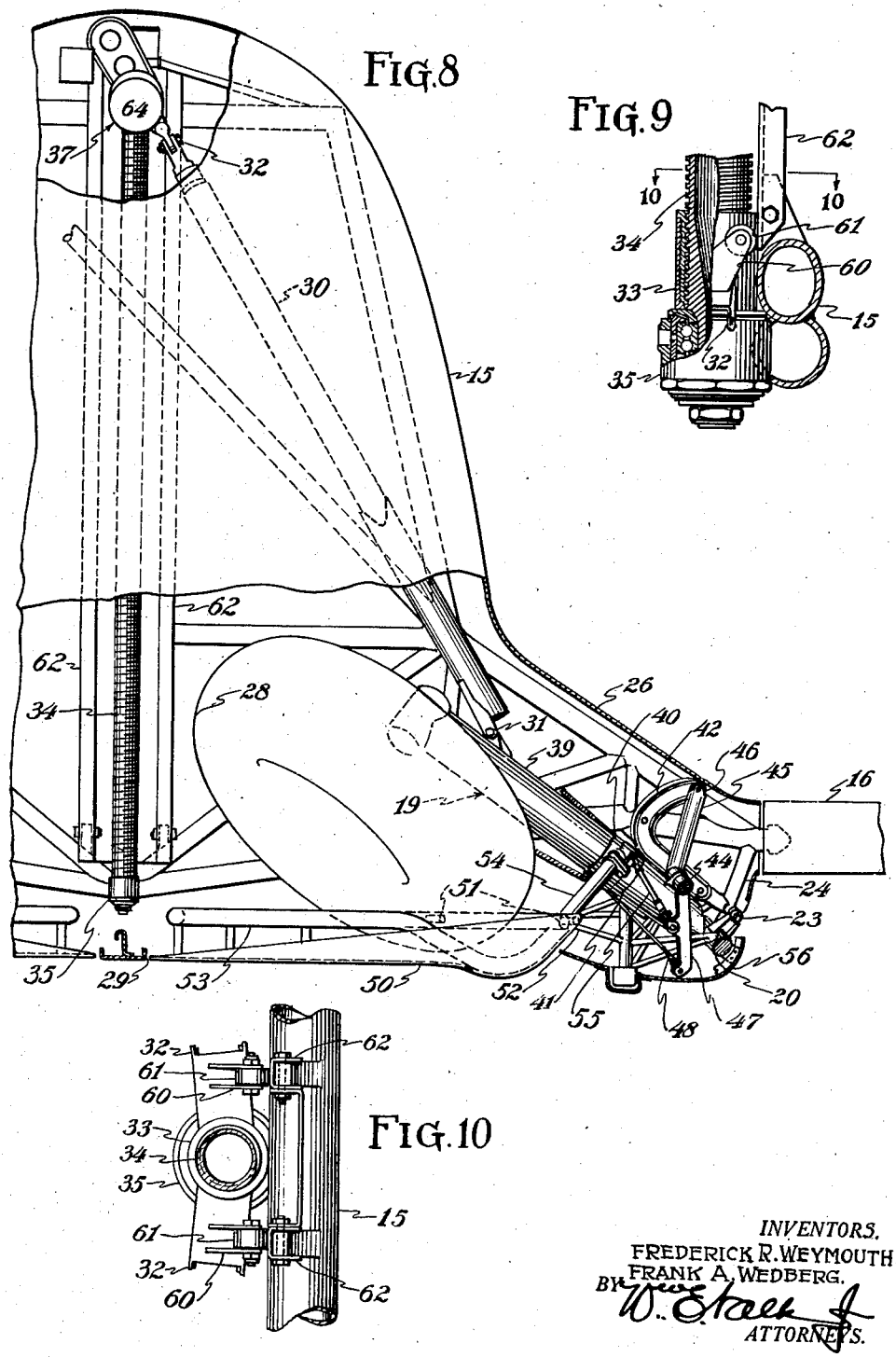

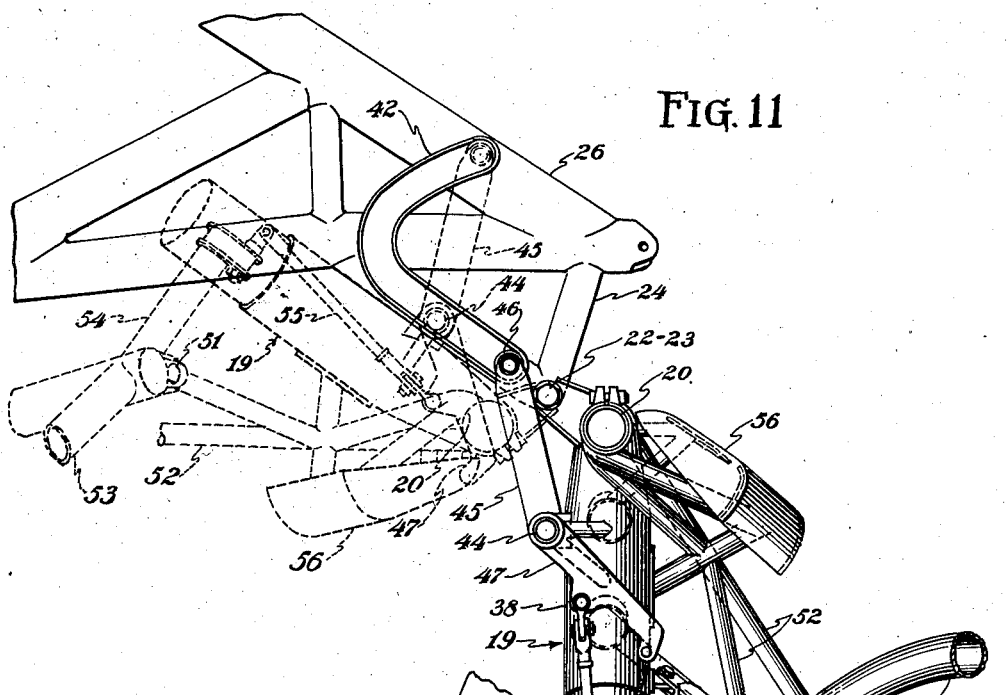
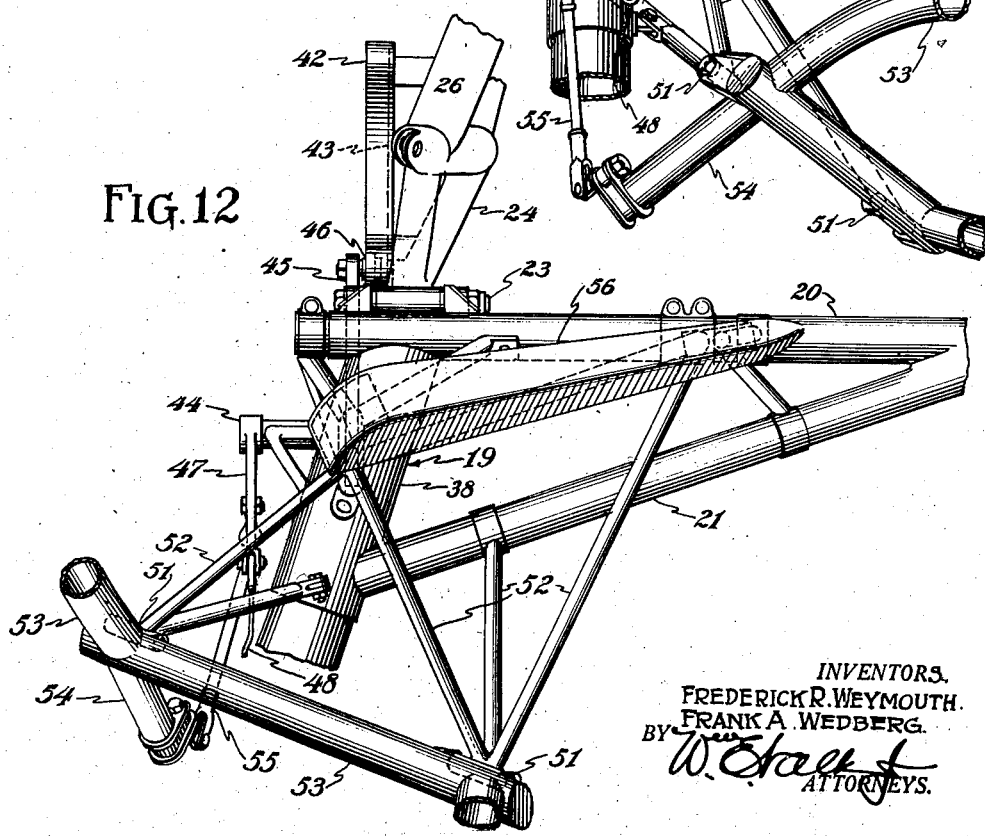

Patented Sept. 17, 1935

2,014,793

UNITED STATES PATENT OFFICE 2,014,793

RETRACTABLE LANDING GEAR

Frederick R. Weymouth and Frank A. Wedberg, Buffalo, N. Y., assignors to Curtiss Aeroplane & Motor Company, Inc., a corporation of New York Application May 17, 1933, Serial No. 671,472

12 Claims. (Cl. 244—2)

This invention relates to improvements in retractable landing gears for aircraft.

An object of the invention is to provide a landing gear adapted to be retracted into the lower part of an airplane fuselage.

A further object is to provide a landing gear structure which, when extended, will lie a considerable distance from the plane of symmetry of the airplane whereby a wide tread for the landing gear is obtained.

A further object is to provide a landing gear having a wheel which is adapted to be tilted, intermediate positions of full extension or retraction, to be addressed by the air stream, whereby the weight of the landing gear is partly counteracted by the blast of air against the tilted wheel.

A further object is to provide a shock absorber strut in the landing gear which is adapted to be partially collapsed when the landing gear is in its retracted position, in order that the retracted landing gear will take up substantially less space within the aircraft fuselage than would be possible if such collapsing were not effected.

A further object is to provide a wheel fairing, adapted to cover the wheel in its retracted position and form a substantial continuation of the fuselage surface, and adapted in the extended position of the landing gear to be carried in a position where no interference with the action of the landing gear is possible.

A further object is to provide the necessary linkage and mechanism for properly carrying the wheel fairing and for collapsing the aforementioned shock absorber strut.

A still further object is to provide a single mechanical means for extending and retracting the complete landing gear, including wheels and the necessary struts and the like, on each side of the plane of symmetry of the aircraft.

Another object is to arrange the struts of a retractable landing gear whereby they are turned between retracted and extended positions about an axis which is oblique or skewed with respect to the longitudinal axis of the aircraft.

Further objects will be apparent in reading the specification and claims.

Briefly, this landing gear, as applied to the fuselage of an aircraft, includes a skew axis at the lower outer edge of the aircraft fuselage, about which a suitably braced collapsible shock absorber strut is adapted to swing. A wheel is carried by this shock absorber strut. A pivoted diagonal strut extends from the shock absorber strut upwardly toward the plane of symmetry of the aircraft, and is held at its upper end on a nut which may be traversed along a vertical lead screw. Upon turning the lead screw, the diagonal strut is drawn upwardly, likewise drawing with it the wheel and shock absorber strut to a position within the fuselage. By virtue of the skew axis about which the shock absorber strut and wheel swing, the wheel, upon initiation of the retracting motion, is tilted so that its forward edge faces inwardly, allowing the blast of air from the air stream to address the side face of the wheel at an angle, thereby tending to raise the wheel to its retracted position. The force of the air is counteracted by the weight of the wheel and the relation of the wheel and skew axis may be so arranged that the force of air against the wheel substantially counterbalances the weight of the wheel and the associated struts. A cam is provided adjacent the upper end of the shock absorber strut, and suitable levers attached to the shock absorber strut engage this cam and serve to partially collapse the shock absorber strut as it is being retracted. Thus, in the fully retracted position, the shock absorber strut occupies a space substantially smaller than it would were the shock absorber strut fully extended. A fairing is carried by the shock absorber strut, and its supports cooperate with the above mentioned cam and levers so that, when the wheel is fully retracted within the fuselage, the fairing is held tightly against the lower surface of said fuselage.

Referring to the drawings, in which similar members indicate similar parts:

Fig. 1 is a side elevation of the forward portion of an aircraft fuselage including the landing gear of this invention in its extended position;

Fig. 2 is a fragmentary front elevation of the fuselage and landing gear in its extended position;

Fig. 3 is a fragmentary plan of the fuselage showing the landing gear in dotted lines in its retracted position;

Fig. 4 is an enlarged front elevation, partly broken away, to show the details of construction of the fuselage and landing gear, and showing the landing gear in an extended position;

Fig. 5 is a side elevation, partly broken away, of the landing gear in an extended position, and a portion of the fuselage;

Fig. 8 is a front elevation, partly broken away, of a portion of the fuselage showing the landing gear in its retracted position;

Fig. 9 is a side elevation, partly in section, of a portion of the landing gear retracting mechanism, indentified with the line 9—9 of Fig. 4;

Fig. 10 is a section on the line 10—10 of Fig. 9;

Fig. 11 is a front oblique elevation of a portion of the landing gear, showing in full lines, the landing gear in its extended position, and in dotted lines, in its retracted position; and Fig. 12 is a side elevation, viewed at a right angle, to that portion of the landing gear shown in Fig. 11, with the landing gear in its extended position.

Figure 6:
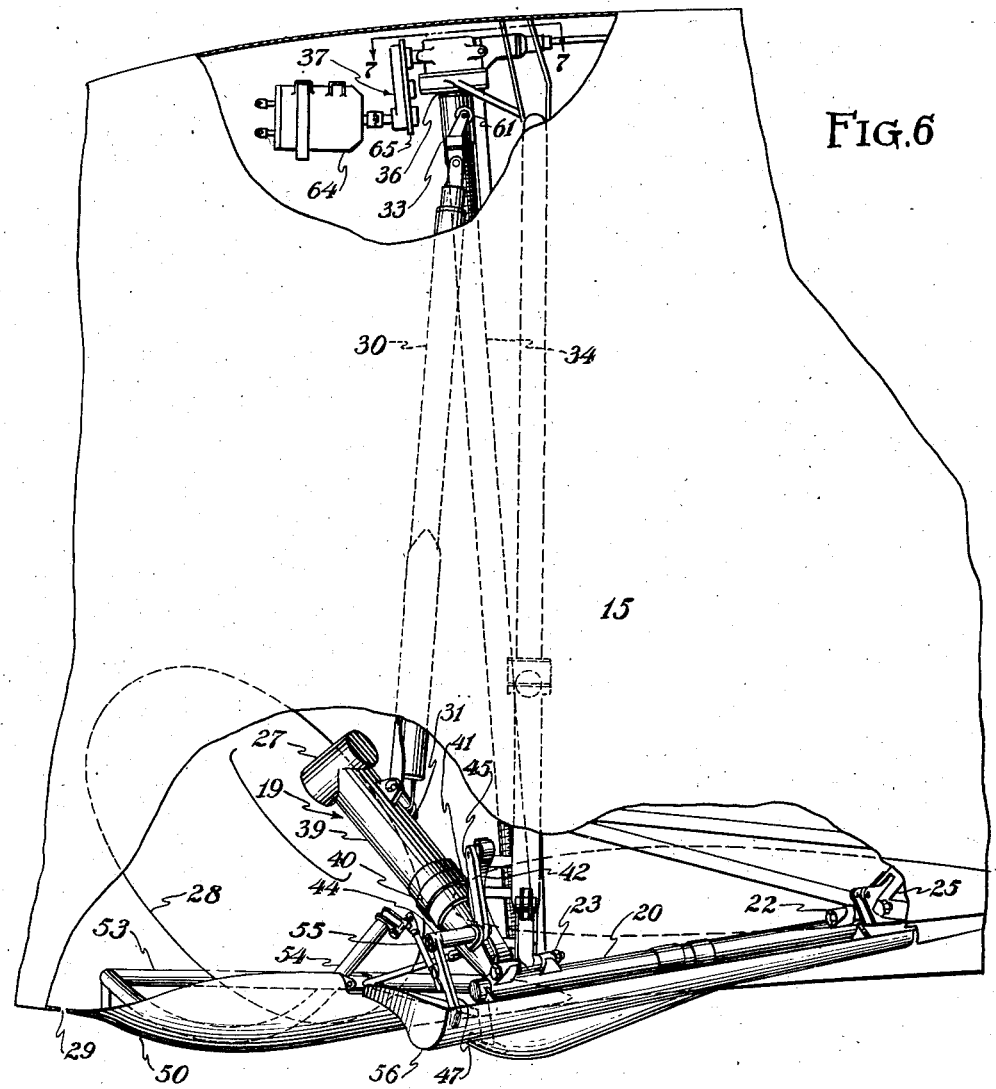
Fig. 6 is a side elevation of a portion of the fuselage, partly broken away, showing the landing gear in its retracted position.

Figs. 1, 2, 4 and 5, show the landing gear as a whole in its extended position. An aircraft fuselage 15, including its structural framework, is provided with the usual wings 16, with a suitable power plant carrying a propeller 17, at its forward end. The fuselage carries a cabin top 18 surrounding the crew cockpit in which are located the various controls necessary for the operation of the aircraft. The landing gear extends downwardly from the forward portion of the fuselage 15 and includes an oleo shock absorbing strut 19 carried by a member 20, to which said strut 19 is braced by a diagonal member 21. The member 20 carries at its ends fittings 22 and 23 which are pivoted to members 24 and 25 of the fuselage 15. Said members 24 and 25 are located in an extension 26 and spaced laterally out from the main portion of the fuselage, and are so arranged that the pivot axis of the member 20 is oblique or skewed with respect to the longitudinal axis of the aircraft. The forward end of the member 20 is spaced laterally and downwardly farther from the longitudinal axis of the aircraft than is the rearward end thereof. At the lower end of the shock absorber strut 19, an axle fitting 27 carries a wheel 28 for ground contact. It will be seen that the landing gear frame, including the member 20, the strut 19, the axle 27 and the wheel 28, may bodily move about the pivot axis of the fittings 22 and 23. When the landing gear is in the extended position, the plane of the wheel will be substantially parallel with the plane of symmetry of the aircraft; as soon as the wheel moves inwardly about the skew axis of the member 20, its forward edge will tilt inwardly and upwardly to a greater extent as such movement persists. This will allow the air stream in which the craft is flying to address at an angle, the side face of the wheel 28, which will tend to urge the landing gear upwardly and inwardly toward the fuselage 15. An opening 29, as shown in Figs. 3, 4, 6 and 8 is formed in the lower surface of the fuselage to permit the entrance of the wheel and landing gear. A diagonal strut 30 is pivoted to the lower part of the shock absorber strut 19, as at 31, and extends upward toward the plane of symmetry of the aircraft, pivotally joining, as at 32, a nut 33. The nut is carried on a lead screw 34, which in turn is journaled at 35 and 36 to the fuselage 15. Dual mechanism 37, to be more fully described later, is provided for turning the lead screw 34, such turning translating the nut 33 upwardly and serving to draw the diagonal strut 30 and the landing gear as a whole upwardly within the fuselage through the opening 29. Figs. 6 and 8 best show the landing gear in the retracted position—it will be noted, as shown in these figures, that the wheel in the fully retracted position is substantially tilted with respect to the longitudinal axis of the aircraft, as a result of its having been turned about the skew axis about which the member 20 has been turned.

The shock absorber strut 19 comprises essentially an upper cylindrical member 38 attached rigidly to the member 20, and a lower cylindrical plunger 39, carrying the axle 27, adapted to telescope within the member 38. Suitable shock absorbing mechanism is provided within the members 38 and 39 in the conventional manner. Those figures which show the landing gear in its extended position, show the shock absorber strut 19 in the "one load" position, in which the aircraft is assumed to be resting on the ground. In such position, the member 39 is telescoped within the member 38, so that a collar 40 on the member 39 abuts the lower end 41 of the member 38. When the aircraft is in the air, the member 39 extends with respect to the member 38, so that the member 39 and the wheel 28 assume a position such as that indicated in dotted lines in Fig. 4. In order that the landing gear as a whole may occupy a minimum of space within the fuselage 15 when it is retracted, it is desirable to telescope the member 39 within the member 38. In order to do this, it is necessary to impose a substantial collapsing force upon the member 39 as the landing gear is retracted, since, in the flight condition, no weight rests on the wheel and the strut 19 as a whole is in its fully extended position. To accomplish this objective, a cam 42 shaped somewhat as an L is rigidly attached to the fuselage extension 26. This cam 42 is of channel section, the plane of its web member 43 lying in a plane normal to the member 20, or the axis about which the landing gear swings upon retraction. A pin 44, with its axis parallel to the member 20, is journalled upon the upper shock absorber strut member 38, and on said pin an arm 45 is mounted for rotation. A roller 46 carried at the upper end of said arm is adapted to engage within the channel of the cam 42. A second arm 47, angled with respect to the arm 45, is mounted on the pin 44 to turn therewith. Figs. 4 and 11 show the position of the arms 45 and 47 when the landing gear is in its extended position—the roller 46 in this position lies at the lower end of the cam 42. As the landing gear is moved toward a retracted position, the roller 46 is caused to slide along the cam 42, and by virtue of the shape of the cam, the arms 45 and 47 are angled with respect to the shock absorber strut 19. When the landing gear has reached a fully retracted position, as shown in Fig. 8 and in dotted lines in Fig. 11, the roller 46 has travelled around the cam 42 to its extreme upper end. This motion has raised the arm 47 with respect to the shock absorber strut 19, having turned said arm 47 in a counter-clockwise direction about the pin 44. A flexible cable 48 of fixed length joins the outer end of the arm 47 with a suitable fitting 49 attached to the collar 40, forming part of the lower telescoping member 39 of the shock absorber 19. By the structure described, it will be apparent that as the landing gear is moved from an extended toward a retracted position, the arm 47 raises with respect to the shock absorber strut, gradually tightening the cable 48 and finally, by the motion of said arm 47, collapsing the lower member 39 within the upper member 38 until, in the retracted position shown in Fig. 8, the member 39 has been telescoped into the member 38 until the collar 40 abuts the lower end 41 of the member 38, placing the shock absorber strut, when fully retracted, in the same attitude as it would be in the "one load" (extended) position. By this means, the shock absorber strut is substantially shortened— in practice, this distance would be on the order of from four to eight inches, and it is obvious that this saving in length of the shock absorber strut allows the landing gear to be stowed in a substantially smaller space within the fuselage than might otherwise be necessary. Conversely, if a given space is available for the retracted landing gear, by using the collapsing mechanism described, the landing gear pivot may be spaced farther away from the plane of symmetry of the aircraft to make possible a considerable wider tread for the landing gear. This is a distinct advantage and gives a result not heretofore accomplished. One of the disadvantages of certain types of retractable landing gears, particularly when applied to single-motored aircraft, has been that the tread of the landing gear is rather limited, making it difficult to maneuver the aircraft on the ground, and increasing the hazard of tipping the ship sideways when landing, with the possibility of damaging or breaking a wing.

In order to cover the landing gear when it has been fully retracted within the aircraft, a fairing 50 is provided which, when the landing gear is fully retracted, lies flush with the surface of the fuselage 15, as shown in Figs. 6 and 8, whereby the continuity of streamline of said fuselage is uninterrupted. This fairing is mounted so as to move with and with respect to the landing gear, and is therefore pivoted as at 51 to suitable structural bracing 52 fixed to the landing gear members 38, 20 and 21. The fairing 50, itself, is carried on a structural framework 53, engaging the pivots 51. A member 54 extends inwardly from the framework 53 and is pivotally linked to the arm 47 by a link 55. Thus, movement of the fairing 50 with respect to the landing gear and the fuselage is controlled by the motion of the arms 45 and 47 as governed by the cam 42, as said landing gear is retracted. In the fully extended position of the landing gear, as shown in Fig. 2, the fairing 50 is swung laterally outward around its pivot 51, to widely clear the wheel 28, whether or not said landing gear is deflected by shocks of ground impact. When the landing gear is retracted, the fairing 50 is gradually swung inwardly about its pivot 51, by virtue of the action of the cam 42 and its associated parts, so that in the final retracted position, the fairing 50 lies rather close to the wheel 28, this position being shown in Figs. 6 and 8.

An auxiliary fairing 56 is attached rigidly to the upper portion of the landing gear, to swing therewith, to provide a flush covering for said upper portion when the landing gear is fully retracted.

In the mechanism for actuating the retractable landing gear, it has been mentioned that a substantially vertical lead screw 34 is carried in centrally disposed bearings 35 and 36 mounted in the fuselage framework. The nut 33, translatable along the lead screw 34, carries a pair of rearwardly extending brackets 60, best shown in Figs. 4, 9 and 10, which carry rollers 61 adapted to roll along a pair of tracks 62, anchored in parallel relationship with the lead screw 34. As the above description of the landing gear mechanism has related to but one side of the landing gear as a whole, the other side may be mentioned as having parts duplicated in opposite phase on the opposite side of the plane of symmetry of the aircraft. The diagonal struts 30 and 30' (the equivalent strut for the opposite side) are both attached to the nut 33. When turning of the lead screw 34 is effected for retraction or extension of the landing gear, the nut 33 is effectively held from turning by the engagement of the rollers 61 with the tracks 62.

Figure 7:
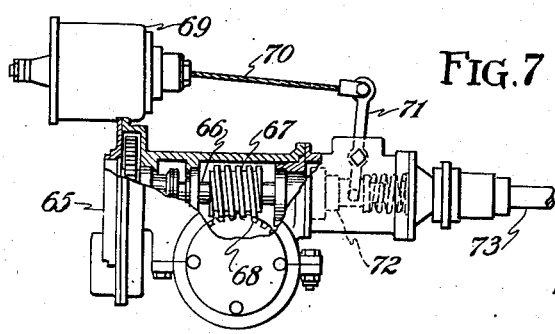
Fig. 7 is a plan, partly in section, of a portion of the retracting control mechanism designated by the line 7—7 in Fig. 6.

It is now understood that the turning of the lead screw 34 accomplishes extension and retraction of the landing gear. The dual mechanism 37, best shown in Figs. 1, 6 and 7, is provided for conveniently turning the lead screw, one part of such mechanism comprising an electric motor 64 driving, through a gear reduction 65, a substantially horizontal shaft 66. Said shaft has mounted thereon a worm 67 which engages with a worm wheel 68 carried on the upper end of the lead screw 34. The electrical connections, well known in the art, for starting and stopping said motor 64, include a conventional solenoid 69 adapted to be activated when electric current is turned into the motor 64. Said solenoid includes a cable 70 connected to a clutch lever 71, which operates a clutch 72 for connecting and disconnecting a shaft 73 to and from the worm shaft 66. The shaft 73 may be flexible, and extends rearwardly into the pilot's compartment of the aircraft. Said shaft has a suitable crank mechanism 74 for manually turning the lead screw. In normal operation, an electric reversing switch is provided for operating the motor 64 and the solenoid 69. When the current is turned on, the solenoid 69 operates the clutch lever 71, disengaging the manual control shaft 73 from the mechanism. Simultaneously, the electric motor 64 starts and turns the lead screw 34 to either retract or extend the landing gear according to the direction of rotation of the motor, which may be suitably controlled by the reversing switch, not shown. As soon as the landing gear has been either extended or retracted, the electric circuit may be opened, whereupon the solenoid 69 allows the clutch 72 to re-engage. Should the electrical current supply for the motor 64 fail, or should the motor itself fail, the manually controlled mechanism for extending and retracting the landing gear is immediately ready for operation by the aircraft crew.

Although the structure involved in the subject landing gear appears somewhat complex, it really resolves down into a quite simple mechanism and produces results which are distinctly advantageous and effective. The subject landing gear has been actually used on a number of aircraft and has been found to give wholly acceptable results. By the cleanness of the aircraft fuselage with the landing gear retracted, substantial increases in aircraft speed over similar craft with fixed landing gears have been obtained, amounting to as much as fifteen to thirty miles per hour. By the unique arrangement of the skew pivot axis for the landing gear, the effort needed for retraction or extension is comparatively slight, which enables the landing gear to be extended or retracted in a minimum length of time—a most desirable characteristic. The operation of the gear is wholly mechanical, and its parts are therefore positive in action and are not subject to undue failure in service. When the landing gear is in its extended position and the aircraft is on the ground, every part of the mechanism thereof is fully exposed to view, greatly facilitating inspection and maintenance thereof. The structure is such that the fuselage cavity within which the landing gear is housed when retracted, is accessible and may easily be kept clean and free from mud and foreign matter.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications and changes.

We claim as our invention:

1. In aircraft, a retractable landing gear including a shock absorber strut adapted to deflect under ground impact, means for retracting said landing gear, and means associated with said landing gear operable to deflect said shock absorber strut when said landing gear is retracted.

2. In aircraft, a retractable landing gear including an oleo strut, means for retracting said landing gear, and means operative upon retraction of said landing gear for compacting said oleo strut.

3. In aircraft having a body, a retractable landing gear including a compressible shock absorbing strut adapted to be compressed upon impact of said landing gear with the ground, means for retracting said landing gear within said body, and a connection between said means and said strut for compressing said strut upon retraction of said landing gear for permitting said gear to occupy a space within said body smaller than would be possible were said strut not compressed.

4. In aircraft, a retractable landing gear comprising a movable member carried by said aircraft, a fixed length strut hinged to said member, a variable length strut hinged to said aircraft and to said fixed length strut, means for moving said member to effect retraction and extension of said landing gear, and a connection between said aircraft and said variable length strut, said connection upon movement of said member, being active to change the length of said variable length strut.

5. In aircraft, a retractable landing gear including a member adapted to be traversed within said aircraft for retracting and extending said landing gear, a collapsible strut hinged at its upper end to said aircraft, a fixed length strut pivoted at one end to said member and at its other end to said collapsible strut, and a connection engaging said aircraft and said collapsible strut, said connection upon traversing of said member to retract said landing gear, being operative to collapse said collapsible strut.

6. In aircraft, a retractable landing gear including a member adapted to be traversed for retracting and extending said landing gear, a fixed length strut, a variable length strut hinged thereto, one said strut being pivoted to said member, and means attached to said variable length strut adapted to compress same upon traversing of said member to a retracted position of said landing gear.

7. In aircraft, a fixed length strut, a variable length strut hinged thereto, means acting on said struts and selectively movable to retract or extend said struts into or from said aircraft, and a connection between a portion of said aircraft and said variable length strut organized to shorten the length of said variable length strut upon movement of said means to retract said struts.

8. In aircraft, a retractable landing gear including a collapsible shock absorber strut including a pair of telescoping members attached at their outer ends, respectively, to a portion of said aircraft and to said landing gear, means for moving said landing gear, with said strut, between extended and retracted positions, a tension device connected to that telescoping member which is attached to said landing gear, and means responsive to movement of said landing gear to a retracted position for tensioning said device to thereby effect partial collapse of said telescoped members.

9. In aircraft, a retractable landing gear including a collapsible shock absorber strut organized for movement between an extended and a retracted position, a cam carried by said aircraft, a cam follower movable both with and with respect to said strut, and a connection between said cam follower and the outer end of said strut, said cam being so shaped as to cause, through the cam follower and said connection, partial collapse of said strut upon retraction of said landing gear.

10. In aircraft, a retractable landing gear including a wheel for ground contact, variable length means for holding said wheel in an attitude for ground contact below said aircraft, means for retracting said wheel and said variable length means within said aircraft, and means responsive to retractive operation of said retracting means for altering the length of said variable length means.

11. In aircraft, a retractable landing gear including a wheel for ground contact, means for holding said wheel below said aircraft in a ground contacting position, said means including a deflectable shock absorbing device by which said wheel is movable substantially vertically to a limited extent upon contact thereof with the ground, means for retracting said wheel holding means and said wheel within said aircraft, and means for deflecting said shock absorbing device responsive in its operation to retraction of said wheel and said wheel holding means.

12. In aircraft, a retractable landing gear including a shock absorber strut swingable between an extended and a retracted position, said strut comprising coacting relatively movable portions, one said portion being hinged to said aircraft for swinging, a wheel movable with the other said shock absorber portion, said other portion being movable both with and with respect to said first shock absorber portion, a cable fixed at one end to said other portion and associated with said aircraft at its other end, said cable serving to effect relative movement of said shock absorber portions upon swinging of said shock absorber strut to a retracted position.

FREDERICK R. WEYMOUTH.
FRANK A. WEDBERG.